United States Patent
Chen et al.

(10) Patent No.: US 9,625,746 B2
(45) Date of Patent: Apr. 18, 2017

(54) SILICON DEPLETION MODULATORS WITH ENHANCED SLAB DOPING

(71) Applicant: ACACIA COMMUNICATIONS INC., Maynard, MA (US)

(72) Inventors: Long Chen, Maynard, MA (US); Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/103,652

(22) Filed: Dec. 11, 2013

(65) Prior Publication Data

US 2015/0212345 A1 Jul. 30, 2015

Related U.S. Application Data

(60) Provisional application No. 61/735,696, filed on Dec. 11, 2012.

(51) Int. Cl.
*G02F 1/025* (2006.01)
*G02F 1/035* (2006.01)

(52) U.S. Cl.
CPC .................................. *G02F 1/025* (2013.01)

(58) Field of Classification Search
None
See application file for complete search history.

(56) References Cited

U.S. PATENT DOCUMENTS

| | | | |
|---|---|---|---|
| 7,085,443 B1 | 8/2006 | Gunn, III et al. | |
| 7,672,553 B2 | 3/2010 | Gill et al. | |
| 7,865,053 B2 | 1/2011 | Gill | |
| 8,362,494 B2 | 1/2013 | Lo et al. | |
| 8,380,016 B1 | 2/2013 | Hochberg et al. | |
| 2011/0180795 A1* | 7/2011 | Lo | G02F 1/025 257/51 |
| 2011/0194803 A1* | 8/2011 | Shin | G02F 1/2257 385/3 |
| 2012/0063714 A1 | 3/2012 | Park et al. | |
| 2012/0189239 A1* | 7/2012 | Tu | G02F 1/025 385/2 |
| 2012/0257850 A1* | 10/2012 | Fujikata | G02F 1/025 385/3 |
| 2016/0202503 A1 | 7/2016 | Chen | |

\* cited by examiner

*Primary Examiner* — Hemang Sanghavi
(74) *Attorney, Agent, or Firm* — Wolf, Greenfield & Sacks, P.C.

(57) ABSTRACT

Disclosed herein are methods, structures, and devices for a silicon carrier-depletion based modulator with enhanced doping in at least part of slab regions between waveguide core and contact areas. Compared to prior designs, this modulator exhibits lower optical absorption loss and better modulation bandwidth without sacrificing the modulation efficiency when operating at comparable bandwidth settings.

9 Claims, 4 Drawing Sheets

SILICON DEPLETION MODULATORS WITH ENHANCED SLAB DOPING

CROSS REFERENCE TO RELATED APPLICATIONS

This application claims the benefit of U.S. Provisional Patent Application Ser. No. 61/735,696 filed Dec. 11, 2012 which is incorporated by reference in its entirety as if set forth at length herein.

TECHNICAL FIELD

This disclosure relates generally to the field of optical communications and in particular to silicon depletion modulators with enhanced slab doping.

BACKGROUND

Contemporary optical communications systems make extensive use of optical modulators. Accordingly, methods, apparatus and structures that improve the operation of such modulators would represent a welcome addition to the art.

SUMMARY

An advance in the art is made according to an aspect of the present disclosure directed to methods, apparatus structures that enhance the operation of optical modulators. More specifically, this disclosure describes silicon carrier-depletion modulators having an enhanced doping in at least part of slab regions between waveguide core and contact areas.

An exemplary silicon depletion modulator according to the present disclosure is doped such that it comprises: a waveguide core region including a p-type region and an n-type region; a p-type contact electrode region; an n-type contact electrode region; a p-type waveguide slab region formed between and connecting the waveguide core p-type region and the p-type electrode region; an n-type waveguide slab region formed between and connecting the waveguide core n-type region and the n-type electrode region; wherein at least one of the waveguide slab regions exhibits a relatively higher doping level in at least part of the slab region as compared with the waveguide core region to which it is connected. As may be readily appreciated, such a structure—when an electrical voltage is applied to the contact electrode regions—will result in the refractive index and absorption coefficient of the waveguide core region being changed.

In sharp contrast to prior art designs, modulators according to the present disclosure advantageously exhibit a lower optical absorption loss and improved modulation bandwidth without sacrificing modulation efficiency when operating at comparable bandwidth settings—as compared to prior art modulators.

BRIEF DESCRIPTION OF THE DRAWING

A more complete understanding of the present disclosure may be realized by reference to the accompanying drawings in which.

DETAILED DESCRIPTION

Figure 1:
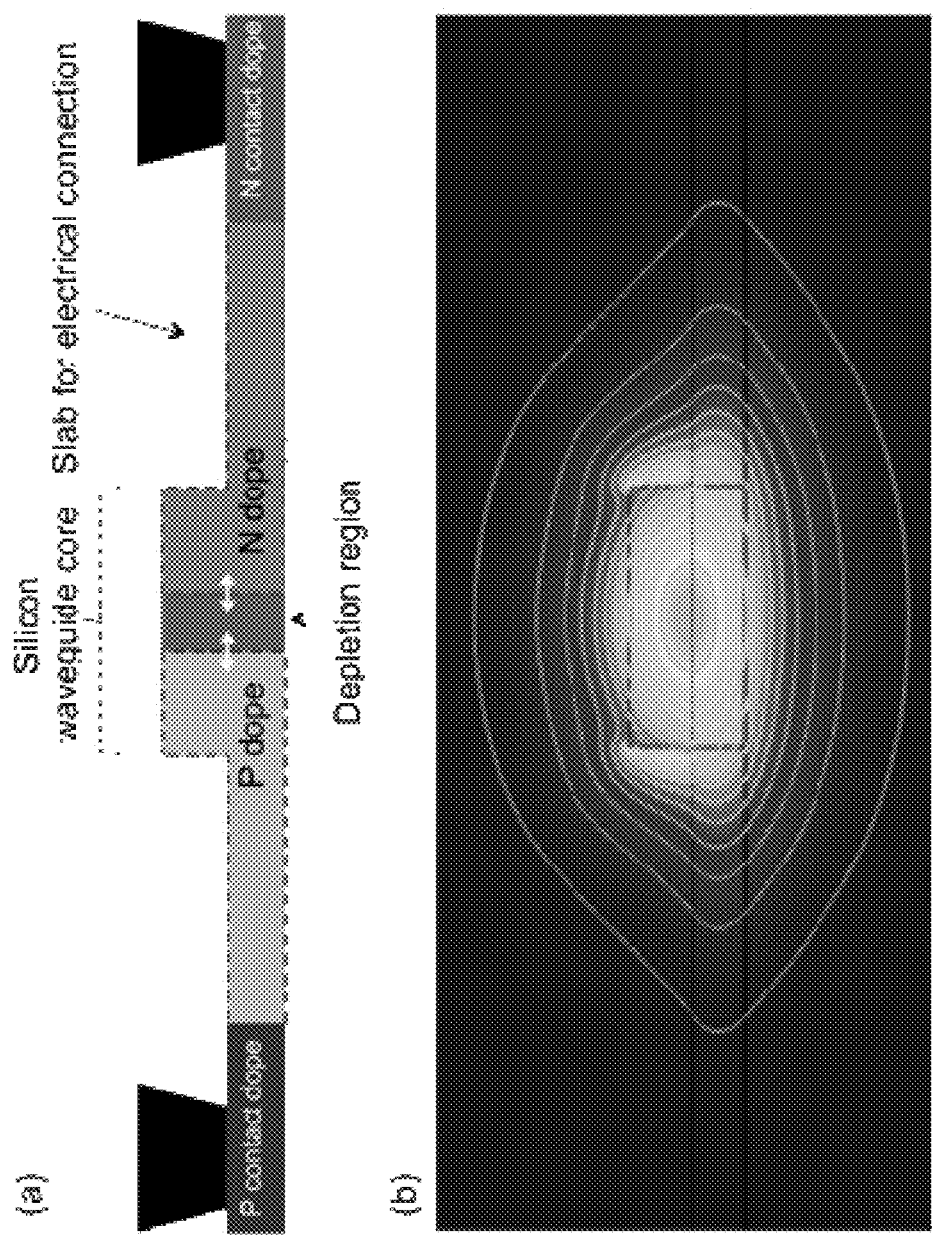
FIGS. 1(*a*) and 1(*b*) show a schematic illustration of (a) schematic and (b) optical mode field of an exemplary prior art carrier-depletion modulator.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by noting that the carrier depletion effect is known and widely used in contemporary silicon modulators. With such modulators, a p-n or p-i-n diode is formed inside a silicon waveguide core, where modulation of a depletion region modulates an optical wave propagating within the waveguide.

With initial reference to FIGS. 1(a) and 1(b), there it shows a schematic illustration of a generalized design of a carrier-depletion modulator and optical mode field in the waveguide region of the modulator. As depicted in that FIG. 1(a), the left part of the silicon waveguide core and the slab connecting the waveguide core and the P contact area is doped such that it exhibits a P-type character. Conversely, the right part of the waveguide core and the slab connecting the waveguide core and the N contact area is doped such that it exhibits an N-type character. A "gap", situated between the P doped area and the N doped area is called the depletion region, which is usually placed close to the center of the waveguide core.

Operationally when an electrical voltage is applied to the P and N contact electrodes, the width of the depletion region changes, i.e., moving the boundaries of the P and N doped area as indicated by the white arrows in FIG. 1(a). Consequently, the concentrations of electrons and holes near the boundaries change, which in turn changes the refractive index and absorption coefficient of the waveguide. As is readily appreciated by those skilled in the art, such changes are utilized to modulate optical phase and amplitude of light traveling along the silicon waveguide.

As may be further appreciated, the performance characteristics of such a modulator, including phase modulation efficiency, optical insertion loss, and modulation bandwidth, are all dependent upon particular design parameters chosen, particularly the doping profiles. For example, heavier doping levels (i.e., greater amounts/concentrations of dopant) in the P and N doped region(s) generally leads to larger index changes for a given change in the width of the depletion region—since the index change in a given area is proportional to the change in carrier concentrations. Unfortunately however, heavier doping levels may also add more optical absorption loss to the modulator.

As an example, an N doped area having carrier concentration levels of 5E17, 1E18 and 5E18 $cm^{-3}$ exhibits absorption coefficients of roughly 18.5 dB/cm, 37 dB/cm, and 185 dB/cm, respectively. For at least this reason, the P and N doped areas should not be too high. Also, the P and N contact doped areas (which typically have doping levels of above 1E20 and absorption coefficient of above 2500 dB/cm) need to be located a sufficient distance from the waveguide core, since even a small amount of mode overlap with these areas might produce substantial losses.

Conversely, if lower doping levels are made in the P and N doped area(s), then series resistance from the contact electrodes to the diode depletion region increases, which in turn may result in lower modulation bandwidth when a relatively long modulator is used.

Figure 2:
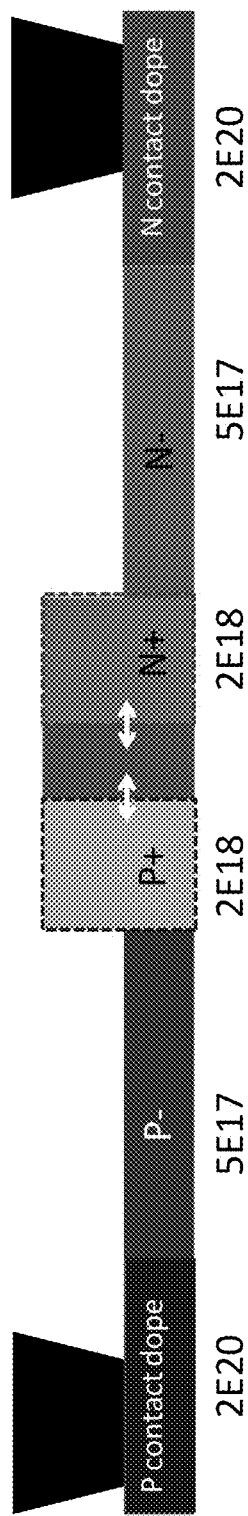
FIG. 2 shows a schematic illustration of a silicon carrier-depletion mode modulator and doping profile which exhibits relatively high doping levels around the waveguide core and lower doping levels in connecting slabs wherein exemplary doping levels (in $cm^{-2}$) are shown along the bottom of the illustration.

With these principles in mind, we note that a modified design has been reported to maintain the high modulation efficiency and reduce the optical absorption loss. A schematic illustration of such a modified design is shown in FIG. 2, wherein slab regions connecting waveguide core and contact areas have reduced doping levels as compared to regions near the depletion window. As may be appreciated, since the slab regions do not directly contribute to the modulation of the depletion window, but still have some amount of overlap with the optical mode field, lowering the carrier concentrations in those regions may advantageously reduce the absorption loss without directly affecting the modulation efficiency.

However, the amount of absorption loss reduction is relatively small, since for many modulator geometries most of the light is confined in the waveguide core area, and only a relatively small portion of light is in the slab regions. In addition, lowering the doping levels in the slab regions increases the series resistance from the contact electrodes to the diode depletion region, which directly hurts the modulation bandwidth for some applications.

We now note that modulators constructed according to the principles of the present disclosure exhibit different doping profiles. More particularly—and instead of having lower doping levels in slab regions and higher doping levels in waveguide core region(s), modulators according to the present disclosure will exhibit relatively higher doping levels in (at least part of) slab regions and relatively lower doping levels in and around waveguide core region(s).

Figure 3:
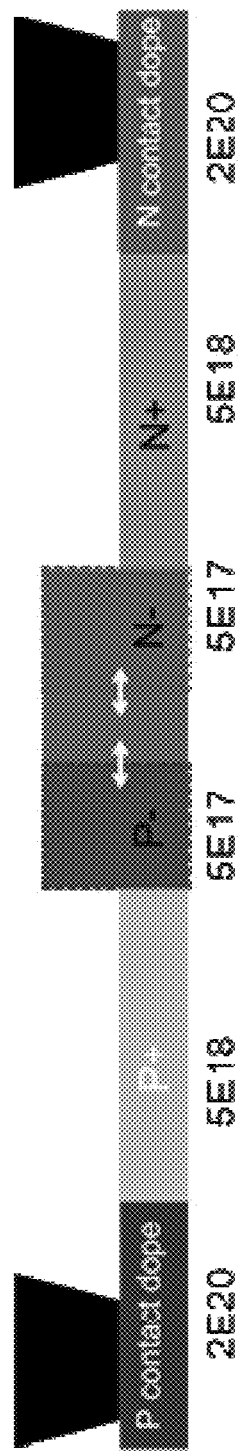
FIG. 3 shows a schematic illustration of a silicon carrier-depletion mode modulator and doping profile which exhibits relatively low doping levels (P– and N–) around the waveguide core and high doping levels (P+ and N+) in slab regions according to an aspect of the present disclosure wherein exemplary doping levels (in $cm^{-3}$) are shown along the bottom of the illustration.

With reference now to FIG. 3, there is shown a schematic illustration of one example of such a modulator design according to an aspect of the present disclosure. More particularly, one may observe in that example illustrated in FIG. 3, that relatively low doping levels (P− and N−) are employed in the waveguide core regions while relatively high doping levels (P+ and N+) are employed in slab regions. Exemplary doping levels (in $cm^{-3}$) are shown at the bottom of that Figure.

Figure 4:
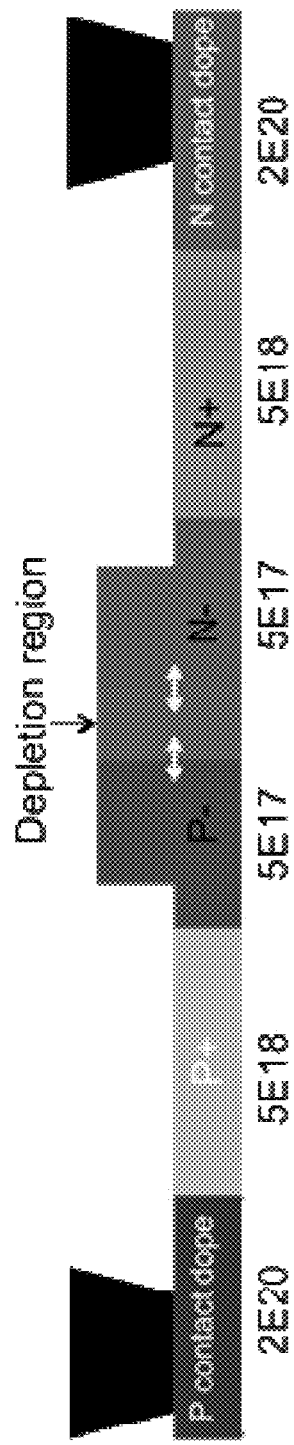
FIG. 4 shows a schematic illustration of a silicon carrier-depletion mode modulator and doping profile where only parts of the slab regions are doped to enhanced levels according to the present disclosure and wherein exemplary doping levels (in $cm^{-3}$) are shown along the bottom of the illustration.

Alternatively, and with reference now to FIG. 4, it may be observed that according to another aspect of the present disclosure, only a portion of the slab regions are doped to the enhanced levels. As may be appreciated, many other variations may be employed while still following these principles of the present disclosure. For example, in some cases, it may be desirable that only one of the two slab regions uses a higher doping level, while the other slab region uses a similar doping level as the waveguide core region. In some other cases, the depletion region might be shifted to one side of the waveguide, and one of the relatively lower doping regions (P− or N− region) becomes very small or disappears altogether.

In summary, one principle of the present disclosure is that at least part of the slab regions connecting the waveguide core and the contact doped regions are doped to higher levels as compared to the waveguide core regions of the same type.

Notably, there exist a number of different techniques that may be employed during fabrication of devices according to the present disclosure to achieve such a doping as described above. One such technique may employ additional implantation steps for the slab regions. Note further that in the drawing accompanying this discussion, all boundaries between different doping regions are shown to be vertical, solely for the purpose of simplicity. In implementations these boundaries can be tilted and/or curved and/or somewhat intermixed and less-sharply defined. Along the propagation direction the cross-sections shown here are assumed to be uniform. However, they can vary in any way still following the disclosure provided herein.

It may be now noted and readily appreciated by those skilled in the art that modulator structures constructed according to the present disclosure may advantageously exhibit lower optical absorption loss and improved modulation bandwidth without sacrificing modulation efficiency when operating at comparable bandwidth settings.

More particularly, since most of the light is confined in a waveguide core area, reducing the doping levels therein advantageously reduces optical absorption losses. Additionally, by doping part of the slab to higher conductivity, series resistance is reduced and bandwidth is improved.

In the example shown in FIG. 4, the enhanced doping in the slab regions reduces the total series resistance by more than 40% as compared to those cases where the slab has the same doping level (i.e., 5E17) as the waveguide core area. Advantageously, additional loss from mode overlap with the enhanced doping regions can be as small as 1 dB/cm.

Finally, it is noted that lower doping levels in the waveguide core area do not sacrifice modulation efficiency—especially when a large modulation bandwidth is required. Higher doping levels do have higher modulation efficiency when the bias voltage is the same for different devices. However, to achieve large bandwidth, relatively large depletion width and small junction capacitance are needed. Higher doping levels require higher bias voltage to obtain the same amount of junction capacitance. Since the modulation efficiency drops as the bias voltage increases due to the nonlinear nature of p-n depletion window, the benefit in modulation efficiency of higher doping gradually diminishes at large bandwidth settings.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A silicon carrier-depletion modulator, comprising:
a waveguide comprising a slab and a core, the core having a first height and including a first core region doped a first conductivity type and a second core region doped a second conductivity type, the first conductivity type being opposite the second conductivity type,
wherein the slab has a second height, different from the first height, and comprises a first slab region doped the first conductivity type, a second slab region doped the first conductivity type, and a third slab region, and
wherein the second and third slab regions are between the first slab region and the first core region, the third slab region is between the second slab region and the first core region, and wherein a first doping level of the first slab region is greater than a second doping level of the second slab region, and the second doping level of the second slab region is greater than a third doping level of the third slab region and a core doping level of the first core region.

2. The silicon carrier-depletion modulator of claim 1, wherein the first core region is disposed between the third slab region and the second core region.

3. The silicon carrier-depletion modulator of claim 1, wherein the first slab region is a first contact electrode region, wherein the silicon carrier-depletion modulator comprises a second contact electrode region in the slab, and wherein the core is configured to exhibit an altered refractive index and absorption coefficient in response to application of an electrical voltage to the first and second contact electrode regions.

4. The silicon carrier-depletion modulator of claim 1, wherein the first core region has a doping level of between $2\times10^{17}$ dopants per $cm^3$ and $10\times10^{17}$ dopants per $cm^3$, the second slab region has a doping level of between $1\times10^{18}$ dopants per $cm^3$ and $5\times10^{18}$ dopants per $cm^3$, and the first slab region has a doping level of substantially $2\times10^{20}$ dopants per $cm^3$.

5. The silicon carrier-depletion modulator of claim 1, wherein the third doping level of the third slab region and the core doping level of the first core region are the same.

6. The silicon carrier-depletion modulator of claim 1, wherein the slab further comprises a fourth slab region doped the second conductivity type, a fifth slab region doped the second conductivity type, and a sixth slab region, wherein the fifth and sixth slab regions are between fourth slab region and the second core region, the sixth slab region is between the fifth slab region and the second core region, and wherein a fourth doping level of the fourth slab region is greater than a fifth doping level of the fifth slab region, and the fifth doping level of the fifth slab region is greater than a sixth doping level of the sixth slab region and a doping level of the second core region.

7. The silicon carrier-depletion modulator of claim 1, wherein the first conductivity type is p-type.

8. The silicon carrier-depletion modulator of claim 1, wherein the first core region and the second core region are separated by a depletion region.

9. The silicon carrier-depletion modulator of claim 1, wherein the core comprises a rib of the waveguide, and wherein the first core region and the second core region each extend substantially through a thickness of the core.

* * * * *